Oct. 8, 1929.  F. C. JOHNSON  1,730,511
HOSE CLAMP
Filed April 4, 1929
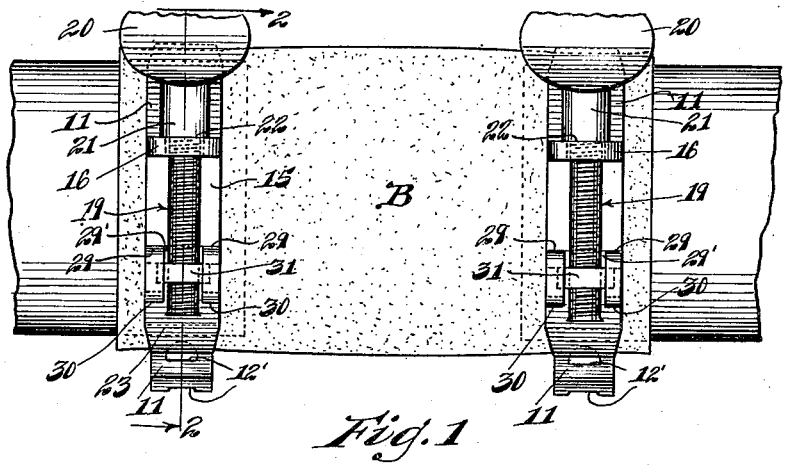
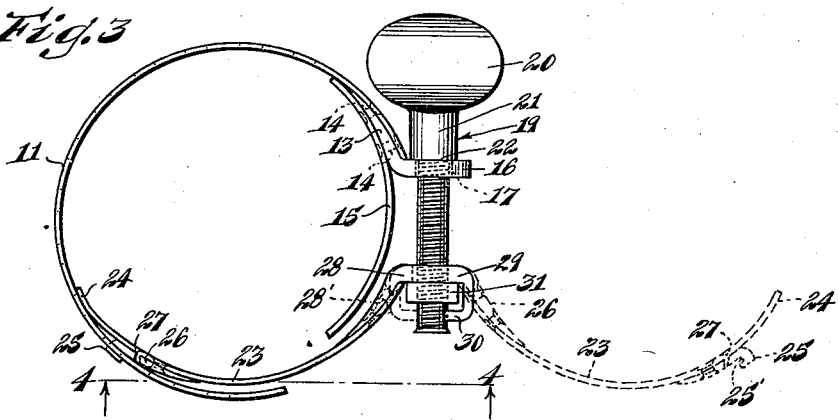
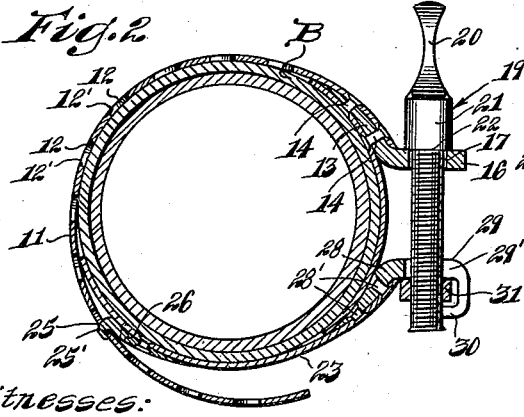
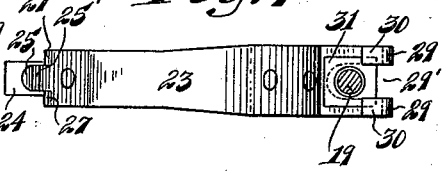
Inventor:
Fred C. Johnson,
By Joshua R. H. Potts
his Attorney.

Patented Oct. 8, 1929

1,730,511

UNITED STATES PATENT OFFICE

FRED C. JOHNSON, OF FRANKLIN PARK, ILLINOIS

HOSE CLAMP

Application filed April 4, 1929. Serial No. 352,342.

This invention relates to hose clamps having for its object the provision of an improved hose clamp, embodying certain desired features in the way of affording additional ease of manipulation in applying and removing the device, together with a more rugged and durable construction.

Additional objects and advantages of the method and construction employed will appear more fully in the details hereinafter set forth, reference being had to the accompanying drawings, in which, Fig. 1 is an elevational view of a pair of hose clamps embodying my invention, operatively applied to a section of hose;

Fig. 2 is a sectional view taken on line 2—2 of Fig. 1;

Fig. 3 is a transverse sectional view of one of my hose clamps, certain parts being shown in elevation and disclosing the manner in which my clamp is adapted to be conveniently applied to and detached from a hose;

Fig. 4 is a fragmentary elevational view of the device, taken on line 4—4 of Fig. 3.

In the drawings, wherein similar characters of reference indicate corresponding parts in the several views of the preferred form of my invention, 11 designates a metal strap having a plurality of struck-out portions or apertures 12 arranged in spaced relation. To one of the ends of the strap 11 a small angle iron or plate 13 is secured by rivets 14, the rivets also passing through a short section of metal stripping 15 underneath the strap 11, the metal stripping serving to link the strap 11 with a second strap hereinafter described.

The angle plate 13 is provided with a projecting lug 16 having a hole 17 therein through which the threaded shank 18 of a thumb screw 19, having a manipulating knob 20 formed integrally with a cylindrical portion or barrel 21 which latter has a shoulder 22 seated against the lug 16,—is passed. A second strap 23 coacting with strap 11 is cut or formed at one end to provide a tongue 24 on which the hook 25, formed integrally with a small metal plate 26, riveted to strap 23, seats. The plate 26 is additionally secured to the strap 23 by thin strips of metal 27 on the margin of the strap 11 which border the tongue 24. The other end of the strap 23 is secured to the underneath thereof by rivets 28', a second angle iron or plate 28 which is provided with a pair of hooks 29 arranged to provide a space 29' which accommodates the threaded shank 18, as clearly shown in Fig. 1, the ends 30 of the hooks 29 being clenched to engage a nut 31 threaded on the shank 18 of the thumb screw.

The hose clamp hereinbefore described is particularly designed and adapted to withstand far more rough usage than conventional types of hose clamps, while providing a more convenient and expeditious means of securing a section of hose to any desired inlet or outlet. By inspection of Fig. 3 it will be seen that the strap 23 can be immediately swung at right angles to the shank 18 of the thumb screw 19, after which strap 11 is placed over the hose B and then strap 23 promptly swung into the position shown in full lines in Fig. 3. The strap 11 is now pressed down to engage the hook 25 in one of the apertures 12, after which the thumb screw is turned, thereby contracting the ring formed by the two straps joined by the hook 25, it being observed that the recessed portion 25' of hook 25 will now receive the square edge 12' at the bottom of the aperture 12. It will be observed that all parts susceptible of breakage are not only of extra thickness of metal, such as the angle irons or plates 13, 26 and 28, but it will also be noticed that these elements are reinforced by the overlying and underlying straps at such points where breakage would be most apt to occur. The hook 25 has also been reinforced by the provision of the tongue 24 which latter, in addition, serves to distribute against the surface of the hose such pressure as might unduly be brought to bear thereon by the hook if unsupported. In this manner the hose itself is guarded against a tendency to fracture or puncture immediately below the tongue 24.

It will, of course, be understood that the invention may be modified and changed without departing from the spirit or sacrificing any of the advantages of the device; and that the details of construction are not to be construed as confining the invention to the particular form illustrated, since it is my desire to avail myself of such changes and embodiments as fairly fall within the scope of the appended claims.

Having thus described my invention, what I claim as new and desire to secure by Letters Patent is:

1. A device of the kind described comprising a pair of straps, a pair of plates secured to said straps, one of said plates having an apertured portion receiving a coacting threaded member, the other of said plates having a pair of hooks loosely retaining a nut, said nut receiving said threaded member, one of said straps having a plurality of spaced apertures formed therein and the other of said straps having a hook at one end.

2. A hose clamp of the kind described comprising a pair of straps, one of said straps having a plurality of apertures formed therein and a plate provided with a lug having a hole, the other of said pair of straps having a hook at one end, and a pair of hooks at the other end arranged in spaced relation and adapted to loosely confine a nut held therebetween, said lug having a hole receiving the threaded shank of an adjusting member, said shank being threadable in said nut while a shouldered portion on said adjusting member coacts with said lug.

3. A hose clamp of the kind described comprising a pair of straps, one of said straps having a plurality of holes therein arranged in spaced relation and adapted to be engaged by a hook formed on a plate secured to a second strap coacting with said first mentioned strap to form a hose engaging clamp, both of said straps having a pair of plates at an end thereof, one of said pair of plates being provided with a hole receiving a threaded shank on a manually operable member, said shank being threadable in a nut non-rotatably confined between a pair of hooks integrally formed on another plate secured to the other of said straps whereby a shoulder on said manually operable member coacting with said lug serves as a means by which said threaded shank is adapted to compress or loosen said pair of straps to bind or release a hose therebetween.

4. A hose clamp of the kind described comprising a pair of straps rotatable about a threaded shank on a manually adjustable member, one of said straps being provided with a pair of hooks arranged to provide a space therebetween, receiving said shank, the other of said straps having an element fastened thereto provided with a hole through which said shank is passed, a nut loosely and non-rotatably confined between said hooks, said nut receiving said threaded shank, a hook secured to said strap having said pair of hooks, a plurality of apertures on said other strap receiving said last mentioned hook, a shoulder on said manually adjustable member co-acting with said element having a hole therethrough whereby, when said manually adjustable member is turned, said nut will coact therewith to expand and contract the ring formed by said straps when connected by said hook.

In testimony whereof I have signed my name to this specification.

FRED C. JOHNSON.